United States Patent [19]

Sato et al.

[11] E Patent Number: Re. 33,142

[45] Reissued Date of Patent: Jan. 9, 1990

[54] CENTRIFUGAL COMPRESSOR

[75] Inventors: Kazuo Sato, Kitaibaraki; Michiaki Ida; Masatosi Terasaki, both of Shimoinayoshi; Masaki Kurimoto, Kashiwa; Shigeo Sugimoto, Ushikumachi, all of Japan

[73] Assignee: Hitachi, Ltd., Tokyo, Japan

[21] Appl. No.: 331,294

[22] Filed: Mar. 31, 1989

Related U.S. Patent Documents

Reissue of:

[64] Patent No.: 4,743,174
Issued: May 10, 1988
Appl. No.: 907,132
Filed: Sep. 12, 1986

U.S. Applications:

[63] Continuation of Ser. No. 789,019, Oct. 18, 1985, abandoned.

[30] Foreign Application Priority Data

Oct. 19, 1984 [JP] Japan ..... 59-218316

[51] Int. Cl.[4] ..... F04B 17/00; F04B 35/00

[52] U.S. Cl. ..... 417/365; 417/423.1; 417/423.6; 417/423.14; 74/421 A

[58] Field of Search ..... 417/365, 423.1, 423.12, 417/423.6, 423.14; 74/421 A; 415/122.1

[56] References Cited

U.S. PATENT DOCUMENTS

| | | | |
|---|---|---|---|
| 1,374,116 | 5/1921 | Schorr | 417/423.12 |
| 2,076,015 | 4/1937 | Broome | 74/421 A |
| 2,350,631 | 6/1944 | Mitchell | 74/421 A |
| 2,926,542 | 3/1960 | Schmitter et al. | 74/421 A |
| 3,434,366 | 3/1969 | Raso et al. | 74/421 A |
| 3,976,390 | 4/1976 | Silvern et al. | 415/122.1 |
| 4,105,372 | 8/1978 | Mishina et al. | 74/421 A |

FOREIGN PATENT DOCUMENTS

| | | | |
|---|---|---|---|
| 2344486 | 3/1974 | Fed. Rep. of Germany | 417/423.1 |
| 64189 | 5/1980 | Japan . | |
| 130521 | 2/1929 | Switzerland | 417/423.1 |

*Primary Examiner*—Donald E. Stout
*Attorney, Agent, or Firm*—Antonelli, Terry & Wands

[57] ABSTRACT

A centrifugal compressor for use in turbo-refrigerators, for example, has a motor casing frame section in which a drive motor is accomodated and a gear casing frame section in which a multiplying gear mechanism is accomodated. The multiplying gear mechanism is connected at its input side with the drive motor and at its output side with an impeller. The mechanism has a first shaft including a rotor shaft of the drive motor and a gear shaft carrying a multiplying gear and separably connected directly with the rotor shaft, a second shaft mounting the impeller and having a pinion meshing with the speed multiplying gear, and bearings mounted on bearing casing frame sections for supporting the first and second shafts at their opposed ends, respectively. The motor casing frame section, gear casing frame section and bearing casing frame section are integrally formed as a unitary body.

2 Claims, 1 Drawing Sheet

U.S. Patent

CENTRIFUGAL COMPRESSOR

Matter enclosed in heavy brackets [ ] appears in the original patent but forms no part of this reissue specification; matter printed in italics indicates the additions made by reissue.

This application is a continuation of application Ser. No. 789,019, filed Oct. 18, 1985, now abandoned.

BACKGROUND OF THE INVENTION

The present invention relates to a centrifugal compressor, and, more particularly, to a centrifugal compressor for use in turbo-refrigerators which enables significant reduction in the manufacturing cost.

There has been an increased demand for higher performance, more compactness and cost reduction in turbo refrigerator construction. Accordingly, when centrifugal compressor is used with a turbo-refrigerator, etc., there has also been an increased demand for further compactness and cost reduction.

Attempts have been made to meet the above demands by providing a drive motor of the smallest size possible appropriate for the centrifugal compressor specified. Nevertheless, it is still necessary for further cost reduction to provide a structure of the type which allows for a reduction in the number of parts or simplification of the manufacturing process.

In a conventional centrifugal compressor for use in turbo-chargers such as, for example, proposed in Japanese Laid Open Application No. 64189/80, the drive system casing is divided into a motor casing section for accommodating a drive motor, and a gear casing section for accommodating a multiplying gear, with the gear casing section and the motor casing section being axially separated or spaced from one another. Furthermore, the gear casing section is connected to the motor casing section by, for example, fastening bolts applied through bolt holes in a flange welded to an abutting end of the motor casing section, with O-rings inserted between the flange and the gear casing section for effecting a hermetic sealing.

Accordingly, with a conventional centrifugal compressor of the aforementioned type, the provision of, for example, fastening bolts, O-rings, etc., necessary for connection of the two casing sections, results not only in an increase in the number of parts but also in an increase in the manufacturing costs by virtue of the need to increase the manufacturing processes for, for example, machining bolt holes in the flange or machining contact surfaces of the flange. Moreover, it is difficult to ensure an accurate fitting of the multiplying gear mechanism relative to the drive motor.

Therefore, an object of the invention is to provide a centrifugal compressor for use in, for example, a turbo-refrigerator a reduction in which enables reducing the manufacturing cost through a reduction in the working processes involved in the machining and assembly of the centrifugal compressor.

According to the invention, a centrifugal compressor is provided comprising a multiplying gear mechanism including a first shaft having a multiplying gear and directly connected with the rotor of a drive motor, with a second shaft mounting an impeller and having a pinion meshing with the multiplying gear. Bearings respectively support the first and second shafts, with the first and second shafts and bearings being accomodated within a casing. The first shaft includes a rotor shaft of the drive motor and a gear shaft carrying the multiplying gear and detachably connected directly with the rotor shaft of the drive motor. The casing includes a motor casing frame section, a gear casing frame section and bearing casing frame sections respectively accomodating the drive motor, multiplying mechanism and bearings and is integrally formed as a unitary body.

The invention will now be described of its embodiments in more details with reference to the accompanying drawings.

DETAILED DESCRIPTION

Figure 1:
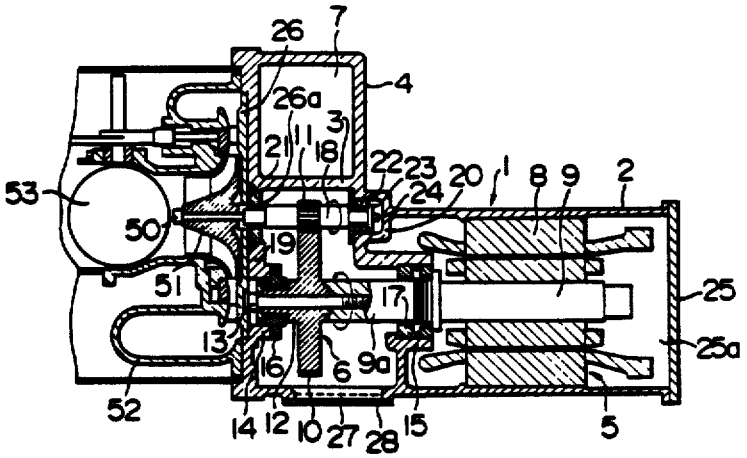
FIG. 1 is a longitudinal sectional view of a centrifugal compressor for use in a turbo-refrigerator embodied according to the invention.

Referring to FIG. 1, a casing, generally designated by the reference numeral at (1), includes a motor casing frame section (2) for accomodating a drive motor generally designated by the reference numeral (5), a gear casing frame section (3) for accomodating a multiplying gear mechanism generally designated by the reference numeral (6), and an oil separating chamber casing frame section (4) for defining an oil separating chamber (7) therein. The drive motor (5) has a stator (8) secured to the motor casing frame section (2) and a rotor (9) rotatably supported with a certain gap from the stator. The multiplying gear mechanism (6) has a multiplying gear (10) and a pinion (11) adapted to mesh with the gear (10).

The multiplying gear (10) is carried by a gear shaft (12) formed integral therewith and detachably connected directly with a rotor shaft (9a) of the drive motor (59) by a bolt (13), to provide a first shaft rotatably supported in the gear casing frame section (3) by plain bearings (16) and (17) mounted on bearing casing frame sections (14) and (15), respectively. A second shaft or pinion shaft (18) has an impeller (51) securely fixed at its end remote from the motor (5) by a further bolt (50), with the second shaft being rotatably supported in the gear casing frame section (3) by plain bearings (21) and (22) mounted on bearing casing frame sections (19) and (20), respectively. At the other end of the second shaft opposite from the impeller (51), a thrust support or collar (23) is fixed by a still further bolt (24) to bear against thrusts of the shaft.

In the above-described arrangement, the casing (1) includes the motor casing frame section (2), gear casing frame section (3), oil separating chamber casing frame section (4) and bearing supporting frame sections (14, 15) and (19, 20) which are all integrally formed as a unitary body. Further, the casing (1) has side plates (25) and (26) for sealingly closing side openings (25a) and (26a) and a closure plate (28) for sealingly closing an access opening for the multiplying gear (10), whereby both of the drive motor (5) and the multiplying gear mechanism (6) are accommodated as closed in the casing 1, the accommodating space being sealed from the outside air and from the impeller side.

Since the motor casing frame section (2) and gear casing frame section (3) are formed in one piece dispensing with joint means that would be otherwise required to connect the two frame sections, the cost involved in the assembly and manufacture can be reduced while the quality of hermetical sealing of the accomodation is enhanced.

The operation of assembling the thus constructed centrifugal compressor for turbo-refrigerator will now be described.

First, with the side plates (25) and (26) removed, the plain bearings (16) and (17) are brought into the gear casing frame section (3) and are mounted on the respective bearing casing frame sections (14) and (15). Subsequently, the plain bearings (21) and (22) are temporarily rotatably mounted on the respective journal portions of the pinion shaft (18), and then the pinion shaft (18) having the pinion (11) is inserted into the gear casing frame section (3) together with the plain bearings (21) and (22) through the side opening (26a) where the side plate (26) is to be restored later, and the plain bearings (21) and (22) are eventually fitted in predetermined positions on the respective bearing casing frame sections (19) and (20).

In this instance, although the pinion shaft (18) has the thrust collar (23) coaxially secured to the end of the shaft remote from the impeller (51) to be mounted later, and the collar (23) has a diameter greater than that of the bearing (22), there will be no inconvenience or problem in the steps of mounting the pinion shaft as described above, because the plain bearings (21) and (22) are previously temporarily mounted on the journal portions before the fastening of the thrust collar (23) is made.

For the assembly of the drive motor (5), the stator (8) is inserted into the motor casing frame section (2) through the side opening (25a) where the side plate (25) is to be restored later, and is fixed in position on the inner circumference of the motor casing frame (2).

Subsequently, the rotor (9) is similarly inserted through the side opening (25a) and temporarily supported on the plain bearing (17).

On the other hand, the gear shaft (12) having the multiplying gear (10) is inserted through the access opening (27) into the gear casing frame section (3) with the closure plate (28) removed. Then, the gear shaft (12) is temporarily supported on the plain bearing (16) while providing intermeshing engagement between the gear (10) and the pinion (11) as previously mounted.

At the same time, one end of the gear shaft (12) near the drive motor (5) which has been temporarily supported on the bearing (7) is brought into engagement with the end of the rotor shaft (9a) remote from the drive motor (5), and the two shafts are firmly connected at their ends by the fastening bolt (13).

As compared with the conventional procedure in which a gear is mounted on the end of an integral gear shaft portion or an extension of the rotor shaft of the drive motor, the system of the present invention in which the gear shaft (12) and rotor shaft (9a) separated from each other are connected together at a position between the respective bearings upon the assembly operation insures substantial reduction of the assembly cost and working hours to a greater extent.

Specifically, according to the invention, some equipment such as hydraulic apparatus for press fitting of the gear can be dispensed with, and further the facilitation of the assembling procedure reduces working hours.

Moreover, it is to be noted that with the conventional construction, the gear is necessarily supported by bearings in a cantilever or overhanging fashion, however, according to the invention, as shown in the embodiment of FIG. 1, the multiplying gear (10) is located between the two bearings (16) and (17), so that the shaft system can be stabilized against vibration.

Turning now back to the assembling procedure, after the rotor shaft (9a) of the drive motor (5) and the gear shaft (12) are connected together to complete the first shaft, the access opening (27) is sealingly closed by the closure plate (28) and the side openings (25a) and (26a) are also sealingly closed by the side plates (25) and (26), thereby completing the assembly of those parts to be accomodated in the unitary casing (1).

Thereafter, the impeller (51) is fixed to one end of the pinion shaft (18) by the bolt (50), and the scroll (52) is mounted on the casing (1), and the guide vane (53) is fixed, thereby completing the assembly of the centrifugal compressor.

In the embodiment as shown, the pinion shaft (18) and gear shaft (12) are arranged with respect to the rotational direction such that the gear reactions produced from the pinion (11) to the gear (10) be directed substantially in a fixed direction. This aims at the stabilization of vibrations in the system by reducing the fluctuations of load imposed upon the bearing (16).

Assuming that the gear shaft (12) and pinion shaft (18) rotate in the direction of arrows shown in FIG. 1, the bearing (16) is acted upon by a force F in the direction of arrow which is the resultant of the gear reaction $F_G$ and a bearing load $F_R$ caused by the weight of the gear shaft (9), (9a), (10), and (12).

Since the bearing load $F_R$ determined by the weight of the first shaft (9), (9a), (10) and (12) remains constant through $F_G$ varies in magnitude depending on the loading condition, the resultant force F only varies in a relatively narrow range determined by the operating pressure angle ($\alpha$) of the tooth engagement of the gear (10), and its direction can be considered to remain substantially unaltered, and further the force F acts in a direction such as to increase loads on the bearings (16) and (17).

Figure 2:
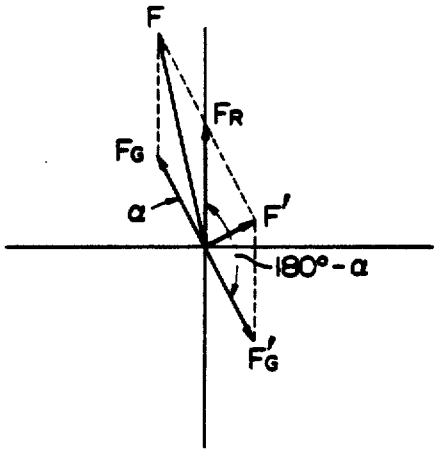
FIG. 2 is a graphical illustration of bearing load conditions occurring in the centrifugal compressor of the present invention and that of the prior art.

Since the small and unstable bearing loads may cause unstable vibrations e.g. oil whirls, the provision of the resultant force F as shown in FIG. 2 implies that stabilization of vibrations has been achieved.

In the case of the conventional practice, on the other hand, the gear reaction represents $F'_G$, just opposite to $F_G$, thus producing a resultant force F'. F' varies in a broader angular range of 180° minus $\alpha$ and limited in magnitude to a smaller value, resulting in reduced bearing loads. This was undesirable for the stabilization of vibrations.

From the foregoing, it will be appreciated that the invention is effective in realization of cost reduction through cutdown of the number of necessary steps involved in the preparation of component parts and their assembly, and in achievement of vibrational stabilization by rendering the bearing loads unidirectional.

Though in the embodiment the invention has been described as applied to a centrifugal compressor for turbo-refrigerators, the centrifugal compressor of the present invention can be of general use in a range of products wherein equal effects can be expected by the practice of the invention.

Also, though the gear (10) on the first shaft has been shown in FIG. 1 as integral with the gear shaft (12), a separate multiplying gear may be prepared and fitted on the gear shaft. It should be noted that in this case, the multiplying gear also can be positioned between the two bearings to thereby provide a vibrationally stable shaft system.

Further, the manner of the connection between the rotor shaft and the gear shaft in the first shaft, the type of thrust bearing in the second shaft, the structure of the bearing casing frame sections, etc. are not limited to those forms as shown in FIG. 1, but may be designed or configured in other forms inasmuch as the similar inventive effects can be expected.

Accordingly, the invention provides a centrifugal compressor for turbo-refrigerators, etc. of the type which can reduce cost by cutdown of the number of necessary steps involved in the fabrication of component parts and their assembly.

What is claimed:

1. A centrifugal compressor comprising:

a drive motor accommodated in a motor casing frame section and comprising a stator and a rotor;

a multiplying gear mechanism accommodated in a gear casing frame section and comprising a multiplying gear and a pinion meshing with said multiplying gear, said multiplying gear mechanism being connected at an input side thereof with said drive motor;

an impeller connected with said multiplying gear mechanism;

a rotor shaft for mounting said rotor in said motor casing frame section rotatably supported by a single bearing mounted on said gear casing frame section and extended into said gear casing frame section;

a gear shaft for mounting said multiplying gear rotatably supported at one end thereof by another single bearing mounted on said gear casing frame section opposite to said first mentioned bearing, said gear shaft and said rotor shaft being directly coupled with each other between said multiplying gear and said first-mentioned bearing to constitute a first shaft;

a second shaft for mounting said pinion rotatably supported at both ends thereof by bearings mounted on said gear casing frame section;

a side opening for said drive motor provided at said motor casing frame section;

a side plate for sealingly closing said opening;

a further side opening for said pinion provided on said gear casing frame section;

a further side plate for sealingly closing said further opening;

an access opening for said multiplying gear provided on said gear casing frame section; and a closure plate for sealingly closing said access opening; and wherein said motor casing frame section is integrally formed with said gear casing frame section.

2. A centrifugal compressor according to claim 1, wherein said second shaft has a thrust support detachably mounted thereon at one end thereof opposite from the other end on which the impeller is mounted.

* * * * *